United States Patent [19]

Wrigglesworth et al.

[11] Patent Number: 5,736,184
[45] Date of Patent: Apr. 7, 1998

[54] PROCESS AND MACHINE FOR PRODUCING FOODSTUFF PARTICLES

[75] Inventors: John Arthur Wrigglesworth, Cleveland; John William Balaan Reed, Easton, Norwich, both of England

[73] Assignee: Zeneca Limited, London, England

[21] Appl. No.: 637,785

[22] PCT Filed: Nov. 8, 1994

[86] PCT No.: PCT/GB94/02448

§ 371 Date: Jul. 18, 1996

§ 102(e) Date: Jul. 18, 1996

[87] PCT Pub. No.: WO95/13170

PCT Pub. Date: May 18, 1995

[30] Foreign Application Priority Data

Nov. 9, 1993 [GB] United Kingdom ............. 9323032

[51] Int. Cl.[6] ............................................. A23P 1/00
[52] U.S. Cl. .................................... 426/518; 83/409.1
[58] Field of Search .................................. 426/518, 503; 99/643; 83/409.1; 209/517

[56] References Cited

U.S. PATENT DOCUMENTS 5,307,940  5/1994  Kanegae ............................ 426/503

FOREIGN PATENT DOCUMENTS

| 531 633 | 3/1993 | European Pat. Off. |
| 2 617 015 | 12/1988 | France. |
| 31 28 109 | 2/1983 | Germany. |
| 40 32 135 | 4/1992 | Germany. |
| 42 17 237 | 12/1992 | Germany. |
| 85/02759 | 7/1985 | WIPO. |

OTHER PUBLICATIONS

Patent Abstracts of Japan, vol. 10, No. 78 (C–335) 27 Mar. 1986, & JP.A.60 214 860, Oct. 28, 1985, see abstract.

Primary Examiner—George Yeung
Attorney, Agent, or Firm—Pillsbury Madison & Sutro LLP

[57] ABSTRACT

Foodstuff particles are produced with ragged ends by tearing them from the ends of strips of the foodstuff by bending the ends.

18 Claims, 1 Drawing Sheet

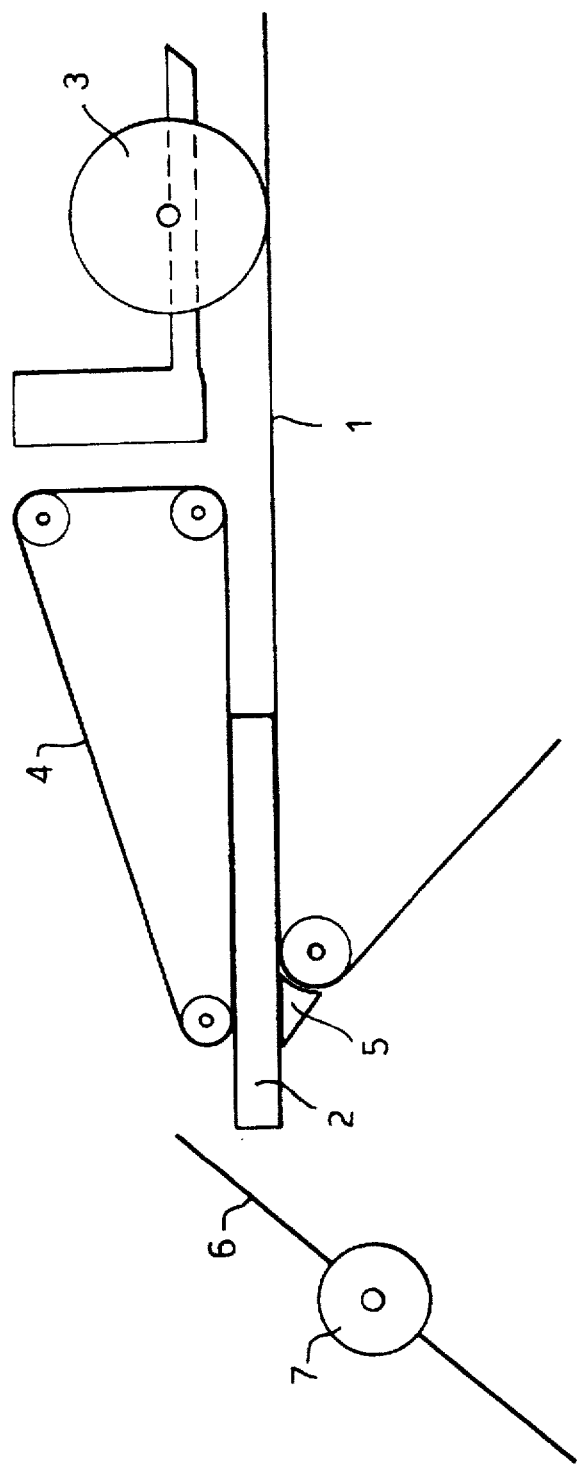

PROCESS AND MACHINE FOR PRODUCING FOODSTUFF PARTICLES

BACKGROUND OF THE INVENTION

This invention relates to a process of producing foodstuff particles.

The acceptability of food to humans is influenced by aesthetic factors such as visual appearance and mouth-feel.

This invention is suitable for the production of particles from fibrous composite foodstuffs. When a mass of such foodstuffs is deformed and fractured, fibre "pull-out" results in the piece having a natural torn appearance.

Examples of such foodstuffs are vegetable based meat analogues and reconstituted meat systems.

SUMMARY OF THE INVENTION

Foodstuffs of high nutritional value produced from fungi, for example Fusarium, suitably Fusarium graminearum may be treated by the invention. Such products may comprise fibrous fungal material in a matrix of gelled hydrocolloid. We have found that they are visually highly acceptable to humans if they have at least one ragged and at least one substantially smooth surface. Products comprising Fusarium graminearum are sold by Marlow Foods Limited under the trade mark "QUORN".

This invention comprises a process of producing foodstuff particles of improved consumer acceptability which comprises forming a foodstuff into a shape (for example a strip, which may be a sheet or rod) gripping one end of the shape by gripping means which comprises one or more surfaces contacting the shape close to one end of the shape and, whilst so gripped but with the edge of the shape protruding unsupported at a position beyond the said gripping means, at least partly tearing the edge from the remainder of the shape by bending it thereby imparting a ragged edge to the shape and to the edge.

The shape may be sliced longitudinally for example with rotating circular blades before the shape is torn as aforesaid and preferably before it is gripped by the gripping means if the shape is wider than the desired width of the particles. Alternatively over-long edges torn from the shape may be fed to a process as above described a second time and pieces torn off at an angle, for example a right angle, to the first tear. The latter procedure allows further ragged edges to be produced.

The process may be carried out intermittently or continuously. In the former case the shape is advanced stepwise and may be gripped only whilst stationary, the bending and tearing action being carried out when the shape is so gripped. However, it is preferred that the process be carried out continuously. This may be effected by advancing the shape between two continuously moving bands which grip the shape and which may conveniently feed the shape to a supporting ledge at which the tearing action may take place; this is desirable if the required bending action cannot be readily accommodated within the curvature available at the outlet end of the bands.

It may be found that a bending action does not sever the edge from the shape completely in that the surface which is not stretched during the bending action may not tear readily. It is preferred in this case to cut the untorn part thereby severing the edge or preferably to contact the untorn part with a blunt member thereby imparting a tearing action at the untorn part and thus severing the edge.

The bending action may be effected by one side of a blade which also imparts a localised tearing action at any part of the edge which is not severed by the main bending action. The blade may be rotated about an axis parallel to the edge of the shape and preferably contacts the edge of the shape at an acute angle to the shape so that the edge meets the flat of the blade rather than the edge of the blade in the first instance. The edge of the blade however preferably sweeps closely past a support surface for the edge of the shape on the side at which bending takes place and thereby imparts a final tearing action to any part which is not torn previously at that position.

One or more for example six such blades may be rotated about a common axis, each acting in turn to perform the above process.

The axis of rotation of the blade is suitably out of the plane of the shape so that the blade contacts the edge of the strip at an acute angle so as to cause it to meet the edge of the shape as described above. The axis of rotation may be adjustable in order to allow variation of the tearing effect. If desired the blades may be angled; for example the plane of the outer portion of the blade may be at an angle of 15° to 45° to the plane of the inner portion. This improves the device if it is desired that the axis of rotation of the blades be in the plane of the billet.

The invention also comprises a machine which comprises means at least partly to tear an edge from a layer of foodstuff in stiff condition by bending the edge thereby imparting a ragged edge to the layer and the torn edge. Suitably the machine comprises means for tearing the edge which acts at least in part by bending the edge of the layer with the flat of a blade. A machine according to the invention comprises means for gripping a layer of a foodstuff close to its end, with an edge of the layer protruding unsupported at a position beyond the gripped position and means for at least partly tearing the edge from the layer by bending it thereby imparting a ragged edge to the layer and the edge.

BRIEF DESCRIPTION OF THE DRAWING

One form of the invention will now be described with reference to the drawing which is a schematic representation.

DESCRIPTION OF PREFERRED EMBODIMENT

A moving belt 1 carries shapes of mycoprotein containing foodstuff in the form of billets 2 past an array of transverse rotary cutting blades 3 running at the same speed as belt 1 and touching to give complete cutting. These slice the billets into longitudinal strips.

From the blades 3 the billets are carried to gripping belt 4 and are advanced between belts 1 and 4 whilst firmly gripped to beyond a bridging nose 5. When an edge of desired dimensions projects beyond the nose 5 it is struck by a flat surface of a blade 6 of a rotating blade assembly 7 thus bending the edge over the nose and tearing it. The edge of blade 6 sweeps closely by the nose 5 and tears any remaining untorn part of the edge of the sheet free and the edge falls into a receiver below the nose (not shown) which may be for example a conveyor belt carrying it to a different location or a hopper.

The belts 1 and 4 may be air cushioned to provide gripping pressure on the billets. The blades 3 are suitably provided with means to strip adhering material from them and the belt 4 is suitably adjustable for height to permit different thicknesses of billets to be accommodated. The speed of rotation of the blade assembly 7 and of the belts 1 and 4 may also be varied to permit particles of different sizes to be produced.

The edges of the sheet normally separate into particles along the cuts made by blades 3 but any particles which remain connected may be readily separated for example by a rotating spiked cylinder.

It will be understood that continuous sheets of material may also be processed or that several billets of sheets may be processed side by side. The belts may be tensioned and driven in a conventional manner.

We claim:

1. A process of producing foodstuff particles with ragged edges which comprises tearing an edge from a layer of a fibrous foodstuff in stiff condition by bending the edge thereby deforming and fracturing it and pulling-out fibre particles thus imparting a ragged edge to the layer and the torn edge.

2. A process of producing foodstuff particles as claimed in claim 1 which comprises forming a foodstuff into a shape, gripping one end of the shape by gripping means contacting the shape close to one end of the shape and whilst so gripped but with the edge of the shape protruding unsupported at a position beyond the said gripping means, at least partly tearing the edge from the remainder of the shape by bending it thereby imparting a ragged edge to the shape and to the edge.

3. A process as claimed in claim 2 in which the shape is a strip.

4. A process as claimed in claim 2 in which the shape is flat and is severed longitudinally by rotating circular blades before it is torn.

5. A process as claimed in claim 4 in which the shape is continuously advanced toward the tearing position.

6. A process as claimed in claim 5 in which the shape is advanced by means of one or more moving belts.

7. A process as claimed in any of claims 2, 3, 4, 5, or 6 in which the shape is gripped near to the tearing position whilst it is torn.

8. A process as claimed in claim 7 in which the shape is gripped above and below by moving belts.

9. A process as claimed in claim 2 in which the edge is bent and torn by contacting it with one side of a blade which contacts the shape at an acute angle to the shape so that the edge meets the flat of the blade rather than its edge in the first instance.

10. A process as claimed in claim 9 in which the shape is fed over a support and the blade sweeps closely past the edge of the support.

11. A process as claimed in claim 10 in which at least one blade which rotates around an axis is present.

12. A process as claimed in claim 11 in which at least two blades which rotate around a common axis are present, said blades acting in succession to contact said shape.

13. A process as claimed in claim 9 in which the blade is angled, the shape contacting portion of the blade being at an angle of 15° to 45° to the plane of the rest of the blade, in which the shape is a strip and in which the blade is rotated so that its axis of rotation is substantially in the plane of the strip.

14. A process as claimed in claim 1 in which the foodstuff is a vegetable matter based meat analogue or a reconstituted meat.

15. A process as claimed in claim 14 in which the foodstuff comprises an edible fungus.

16. A process as claimed in claim 15 in which the fungus is Fusarium.

17. A machine for producing foodstuff particles with ragged edges which comprises means for gripping a layer of a foodstuff close to its end with an edge of the layer protruding unsupported at a position beyond the gripped position and means for at least partly tearing the edge from the layer by bending it thereby imparting a ragged edge to the layer and the edge.

18. A machine according to claim 17 which comprises means at least partly to tear an edge from a layer of a foodstuff in stiff condition by bending the edge which means comprises a blade to contact the shape at an acute angle to the shape so that the edge of the layer meets the flat of the blade rather than the edge of the blade in the first instance thereby imparting a ragged edge to the layer and the torn edge.

* * * * *